United States Patent [19]

Shimozawa et al.

[11] Patent Number: 4,726,990

[45] Date of Patent: Feb. 23, 1988

[54] MAGNETIC RECORDING MEDIUM

[75] Inventors: Toru Shimozawa; Shigeyo Miyamori; Masaharu Nishimatsu, all of Nagano, Japan

[73] Assignee: TDK Corporation, Tokyo, Japan

[21] Appl. No.: 927,596

[22] Filed: Nov. 6, 1986

[30] Foreign Application Priority Data

| Nov. 6, 1985 | [JP] | Japan | 60-248562 |
| Nov. 6, 1985 | [JP] | Japan | 60-248563 |
| Nov. 7, 1985 | [JP] | Japan | 60-249780 |
| Nov. 7, 1985 | [JP] | Japan | 60-249781 |

[51] Int. Cl.$^4$ .................. G11B 5/70; G11B 5/714
[52] U.S. Cl. .................. 428/323; 427/44; 427/131; 428/329; 428/694; 428/900
[58] Field of Search .......... 428/323, 336, 694, 900; 427/128, 131, 44

[56] References Cited

U.S. PATENT DOCUMENTS

| 4,425,401 | 1/1984 | Ido et al. | 428/694 |
| 4,480,004 | 10/1984 | Togawa et al. | 428/694 |
| 4,486,496 | 12/1984 | Dezawa et al. | 427/131 |
| 4,517,257 | 5/1985 | Shimizu et al. | 427/131 |
| 4,560,616 | 12/1985 | Okita et al. | 427/128 |
| 4,565,726 | 1/1986 | Oguchi et al. | 428/900 |
| 4,624,894 | 11/1986 | Kishimoto | 427/131 |

FOREIGN PATENT DOCUMENTS

| 2739430 | 9/1977 | Fed. Rep. of Germany . |
| 2644494 | 10/1977 | Fed. Rep. of Germany . |
| 2840095 | 9/1978 | Fed. Rep. of Germany . |
| 2920733 | 5/1979 | Fed. Rep. of Germany . |
| 2929847 | 7/1979 | Fed. Rep. of Germany . |
| 3042065 | 11/1980 | Fed. Rep. of Germany . |
| 3120988 | 5/1981 | Fed. Rep. of Germany . |
| 3151590 | 12/1981 | Fed. Rep. of Germany . |
| 3219779 | 5/1982 | Fed. Rep. of Germany . |
| 3219778 | 5/1982 | Fed. Rep. of Germany . |
| 3243676 | 11/1982 | Fed. Rep. of Germany . |
| 3302911 | 1/1983 | Fed. Rep. of Germany . |
| 3321924 | 6/1983 | Fed. Rep. of Germany . |
| 3327104 | 7/1983 | Fed. Rep. of Germany . |
| 3328720 | 8/1983 | Fed. Rep. of Germany . |
| 3427532 | 7/1984 | Fed. Rep. of Germany . |
| 3436260 | 10/1984 | Fed. Rep. of Germany . |
| 3608595 | 3/1985 | Fed. Rep. of Germany . |
| 3541857 | 11/1985 | Fed. Rep. of Germany . |
| 3607500 | 3/1986 | Fed. Rep. of Germany . |

*Primary Examiner*—Paul J. Thibodeau
*Attorney, Agent, or Firm*—Oblon, Fisher, Spivak, McClelland & Maier

[57] ABSTRACT

A coating type magnetic recording medium particuarly suitable as a mangetic disk is provided, which comprises a substrate and a magnetic layer of a plate magnetic powder and a binder on the substrate. Selection is made such that the plate magnetic powder has an average particle diameter of up to 0.2 μm and an average flakiness of at least 2, the magnetic layer is up to 1.8 μm thick, and the magnetic recording medium has a coercive force of a value x in Oe and a rectangular ratio Br/Bm of a value y both in a direction perpendicular to the magnetic layer surface, which fall in the range defined by the following equations:

$400 \leq x \leq 800$, $y \leq 1$, and $0.5 \leq y \leq 0.75$ where $750 \leq x \leq 800$, and $0.5 \leq y \leq -0.001x + 1.5$ where $400 \leq x < 750$.

5 Claims, 1 Drawing Figure

MAGNETIC RECORDING MEDIUM

CROSS REFERENCE TO THE RELATED APPLICATIONS

Reference is made to copending U.S. application Ser. No. 839,570 filed Mar. 14, 1986, for Magnetic Recording Medium; Ser. No. 849,860 filed Apr. 9, 1986; and Ser. No. 854,025 filed Apr. 21, 1986, for Magnetic Recording Medium where all applications are assigned to the same assignee as the present invention.

BACKGROUND OF THE INVENTION

This invention relates to a magnetic recording medium of coating type having a magnetic layer containing hexagonal plate magnetic powder. More particularly, it relates to such a magnetic recording medium in the form of a disk having improved runnability, overwriting ability, and output.

In recent years, it is strongly desired in the field of magnetic recording to increase recording density to provide for expanded recording capacity and compactness. Among coating type magnetic recording media having the inherent advantage of productivity, most widely used are those having a magnetic layer containing needle magnetic powder such as $\gamma$-Fe$_2$O$_3$ and cobalt-coated $\gamma$-Fe$_2$O$_3$. However, these magnetic recording media using such magnetic powder have a certain limit in recording density.

In order to achieve a higher recording density, a new system is proposed which utilizes the residual magnetization of a magnetic recording medium in a direction perpendicular to its major plane. The perpendicular magnetizable layer of such media contains hexagonal plate magnetic powder, for example, barium ferrite and strontium ferrite. These perpendicular magnetic recording media offer a higher recording density, but suffer from several problems when formed as magnetic disks which are operated with conventional ring-type magnetic heads. That is, the perpendicular magnetic recording disks are insufficient in runnability, overwriting characteristics and output, and suffer from dynamic durability during operation. There is a need for improvements in these respects.

SUMMARY OF THE INVENTION

An object of the present invention is to provide a novel and improved coating type perpendicular magnetic recording medium, typically magnetic disk, having improved runnability and overwriting characteristics and increased recording density and output while maintaining its durability during operation.

The present invention provides a magnetic recording medium comprising a substrate having opposing major surfaces and a magnetic layer on one major surface of the substrate comprising a plate magnetic powder and a binder. According to the feature of the present invention, the plate magnetic powder has an average particle diameter of up to 0.2 $\mu$m and an average flakiness of at least 2. The magnetic layer has a thickness of up to 1.8 $\mu$m. The magnetic recording medium has a coercive force having a value x as expressed in oersted and a rectangular ratio having a value y both in a direction perpendicular to the surface of the magnetic layer, which fall in the range defined by the following equations:

$$400 \leq x \leq 800, y \leq 1, \text{ and}$$

$$0.5 \leq y \leq 0.75 \text{ where } 750 \leq x \leq 800, \text{ and}$$

$$0.5 \leq y \leq -0.001x + 1.5 \text{ where } 400 \leq x \leq 750.$$

BRIEF DESCRIPTION OF THE DRAWING

The above and other objects, features, and advantages of the present invention will be more fully understood from the following description taken in conjunction with the accompanying drawing, in which:

The FIGURE is the only drawing showing the range defined for coercive force x and rectangular ratio y according to the present invention.

DETAILED DESCRIPTION OF THE INVENTION

Figure 1:
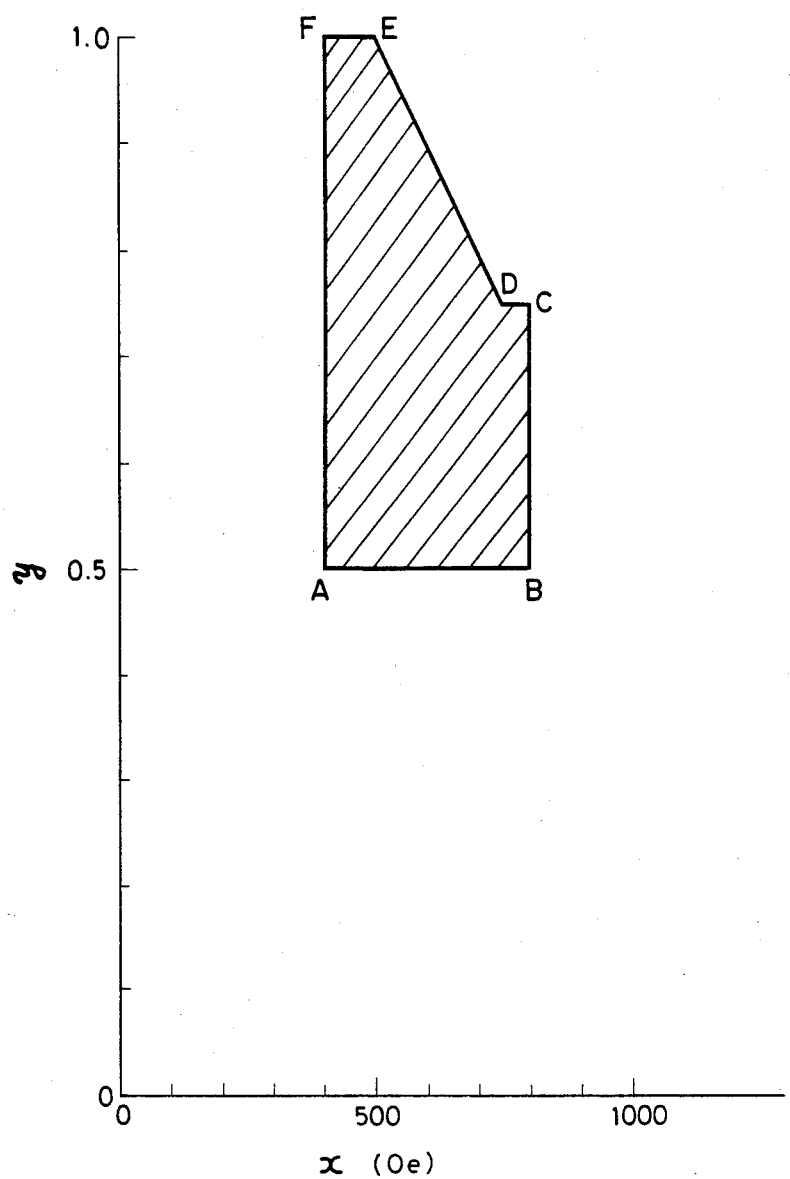

The coating type perpendicular magnetic recording medium according to the present invention (sometimes referred to as medium or disk for brevity sake) has a magnetic layer which contains a hexagonal plate-shaped magnetic powder and a binder.

The magnetic layer has a thickness of up to about 1.8 $\mu$m, preferably from about 0.4 to 1.6 $\mu$m, and more preferably from about 0.4 to about 1.4 $\mu$m. Thicknesses of more than about 1.8 $\mu$m result in poor overwriting ability. It is then difficult to satisfactorily overwrite the disk using a ring-type magnetic head while maintaining the recording density high enough. The minimum thickness of the magnetic layer is approximately 0.4 $\mu$m. It is difficult to coat a magnetic coating composition to a thickness of less than 0.4 $\mu$m and hence, to produce a magnetic layer having a flat and smooth surface and good envelope characteristics.

According to the present invention, the magnetic recording medium should satisfy the following relationship:

$$400 \leq x \leq 800, y \leq 1, \text{ and}$$

$$0.5 \leq y \leq 0.75 \text{ where } 750 \leq x \leq 800, \text{ and}$$

$$0.5 \leq y \leq -0.001x + 1.5 \text{ where } 400 \leq x \leq 750.$$

wherein in a direction perpendicular to the surface of the magnetic layer, the coercive force Hc$_\perp$ of the medium has a value x as expressed in oersted and the rectangular ratio Br$_\perp$/Bm$_\perp$ of the medium has a value y. The range defined for coercive force x and rectangular ratio y according to the invention is drawn in FIG. 1 as a cross-hatched region defined and encompassed by polygon ABCDEF including all the lines A-B-C-D-E-F-A.

When the value y of perpendicular rectangular ratio Br$_\perp$/Bm$_\perp$ and the value x of coercive force Hc$_\perp$ are outside the above-defined ranges, the medium exhibits not only less improved runnability, but also reduced overwriting ability and recording density.

The preferred range is defined by the equations:

$$500 \leq x \leq 780, \text{ and}$$

$$0.5 \leq y \leq 0.75 \text{ where } 750 \leq x \leq 780, \text{ and}$$

$$0.5 \leq y \leq -0.001x + 1.5 \text{ where } 500 \leq x \leq 750.$$

The more preferred range is defined by the equations: $500 \leq x \leq 750$ and $0.5 \leq y \leq -0.001x + 1.5$.

The value y of perpendicular rectangular ratio $Br_\perp/Bm_\perp$ has the upper limit of 1 or less, and preferably ranges from 0.5 to 0.99.

Within the general and preferred ranges as defined above, the resulting media exhibit satisfactory overwriting ability and high recording density as well as improved runnability. If the perpendicular rectangular ratio value y and coercive force value x are too high, the media exhibit deteriorated overwriting ability and are thus difficult to overwrite with a ring-type head. Conversely, if the perpendicular rectangular ratio value y is too low, the magnetic layer has a reduced surface roughness and fails to provide a high recording density. If the coercive force value x is too low, the medium produces no satisfactory output.

The perpendicular rectangular ratio $Br_\perp/Bm_\perp$ and coercive force $Hc_\perp$ of a magnetic recording medium are measured by determining a magnetization curve in a direction perpendicular to the surface of the magnetic layer or medium followed by correction for demagnetization field. The residual magnetization $Br_\perp$, saturation magnetization $Bm_\perp$, and coercive force $Hc_\perp$ are then determined from the corrected magnetization curve. The perpendicular rectangular ratio is given as a ratio of the thus obtained $Br_\perp$ to $Bm_\perp$. This measurement also applies to double sided recording media.

Magnetic Powder

The hexagonal plate-shaped magnetic powder used herein is preferably comprised of hexagonal plate-shaped ferrites including barium and strontium ferrites.

The magnetic plates have an average particle diameter. of up to about 0.2 μm, preferably about 0.05 to 0.15 μm. Average particle diameters of more than 0.2 μm will reduce the surface roughness and linear recording density. The average thickness of magnetic plates ranges up to about 0.10 μm, preferably from about 0.003 to 0.075 μm, and most preferably from about 0.0013 to 0.05 μm.

The average particle diameter used herein is determined by taking an electron photomicrograph of particles, for example, of hexagonal barium ferrite under either a scanning electron microscope (SEM) or a transmission electron microscope (TEM), measuring the diameter of fifty (50) particles in cross section, and averaging the measurements. The average thickness is also obtained by averaging measurements on an electron photomicrograph. The average flakiness R is then given as the average particle diameter d divided by the average thickness t, that is, R=d/t. It is understood that the average diameter and thickness may also be obtained by measuring the half-width at $2\theta$ from an X-ray diffraction pattern.

The average flakiness of magnetic plates given as the average particle diameter divided by the average thickness should be at least 2. The durability of the medium during operation is further improved when the average flakiness is at least 6, preferably from 6 to 40. The durability of the medium during operation is improved because plates having a relatively high flakiness are regularly oriented to resist against abrasion. Plates having an average flakiness of less than 2 are difficult to provide a high recording density.

The barium ferrites used herein include a hexagonal barium ferrite conforming to $BaFe_{12}O_{19}$ and analogues, and partially substituted barium ferrites of the same formula wherein some Ba and Fe atoms are replaced by other metal atoms such as Ca, Sr, Pb, Co, Ni, Ti, Cr, Zn, In, Mn, Cu, Ge, Nb, Zr, Sn, etc. A mixture of two or more of them may be used.

Also included are a hexagonal strontium ferrite conforming to $SrFe_{12}O_{19}$ and analogues, and similarly substituted ones. Mixtures of these barium and strontium ferrites may be used.

Barium ferrite and analogues may be prepared by any desired processes, for example, ceramic process, codeposition-sintering process, hydrothermal synthesis process, flux process, glass crystallization process, alkoxide process, and plasma jet process. These processes are described in detail in an article by Y. Koike and O. Kubo, "Ceramics", 18, No. 10 (1983).

The magnetic powder preferably has a coercive force of lower than 800 Oe, preferably from 400 to 750 Oe, and more preferably from 400 to 700 Oe.

Binder

The plate magnetic material is prepared into a magnetic coating composition with the aid of a binder which may be selected from radiation curable resins, thermoplastic resins, thermosetting resins, and reactive resins, and mixtures thereof. The thermosetting resins and radiation curable resins are preferred because of the strength of the resultant coatings.

The thermoplastic resins used herein are resins having a softening point of lower than 150° C., an average molecular weight of 10,000 to 200,000, and a degree of polymerization of about 200 to 2,000.

The thermosetting and reactive resins used herein have a similar degree of polymerization. Upon heating after coating and drying, they are converted through condensation, addition or other reactions into polymers having an infinite molecular weight. Preferred among them are those which do not soften or melt until they are thermally decomposed.

Some illustrative non-limiting examples of the resins include resins of condensation polymerization type such as phenol resins, epoxy resins, polyurethane resins, urea resins, butyral resins, formal resins, melamine resins, alkyd resins, silicone resins, acrylic reactive resins, polyamide resins, epoxy-polyamide resins, saturated polyester resins, and urea-formaldehyde resins; mixtures of a high molecular weight polyester resin and an isocyanate prepolymer, mixtures of a methacrylate copolymer and a diisocyanate prepolymer, mixtures of a polyester polyol and a polyisocyanate, mixtures of low molecular weight glycol/high molecular weight diol/triphenylmethane triisocyanate, etc.; mixtures of any one of the foregoing condensation polymerization resins and a crosslinking agent such as isocyanates; mixtures of a crosslinking agent and a vinyl copolymeric resin such as a vinyl chloride-vinyl acetate copolymer (which may have carboxylic units incorporated therein), a vinyl chloride-vinyl alcohol-vinyl acetate copolymer (which may have carboxylic units incorporated therein), a vinyl chloride-vinylidene chloride copolymer, a vinyl chloride-acrylonitrile copolymer, a vinyl butyral copolymer, a vinyl formal copolymer, etc.; mixtures of a crosslinking agent and a cellulosic resin such as nitrocellulose, cellulose acetobutyrate, etc.; mixtures of a crosslinking agent and a synthetic rubber such as butadiene-acrylonitrile, etc.; and mixtures of any of the foregoing members.

Particularly preferred are mixtures of an epoxy resin, a butyral resin, and a phenol resin; mixtures of an epoxy resin, polyvinyl methyl ether, and methylol phenol ether as disclosed in U.S. Pat. No. 3,058,844; and mixtures of a bisphenol-A epoxy resin and an acrylate or methacrylate polymer as disclosed in Japanese Patent Application Kokai No. 49-131101.

These thermosetting resins may generally be cured by heating in an oven at about 50° to 80° C. for about 6 to 100 hours.

Particularly preferred among the binders are radiation-curable resins, that is, resins obtained by partially curing a radiation-curable compound.

Illustrative radiation-curable resins are thermoplastic resins having contained or incorporated in their molecule groups capable of crosslinking or polymerizing upon exposure to radiation, for example, acrylic double bonds as given by acrylic and methacrylic acids having an unsaturated double bond capable of radical polymerization and esters thereof, allyl double bonds as given by diallyl phthalate, and unsaturated bonds as given by maleic acid and maleic derivatives. Other compounds having unsaturated double bonds capable of crosslinking or polymerizing to dryness upon exposure to radiation may also be used.

Typical of the resins in the form of thermoplastic resins having contained in their molecule groups capable of crosslinking or polymerizing upon exposure to radiation are unsaturated polyester resins. Included are polyester resins having radiation-sensitive unsaturated double bonds in their molecular chain, for example, unsaturated polyester resins which may be prepared by a standard process of esterifying polybasic acids of (2) as will be described below and polyhydric alcohols into saturated polyester resins except that the polybasic acids are partially replaced by maleic acid so that the resulting polyesters may have radiation-sensitive unsaturated double bonds.

The radiation-curable unsaturated polyester resins may be prepared by adding maleic acid or fumaric acid to at least one polybasic acid and at least one polyhydric alcohol, conducting dewatering or alcohol-removing reaction in a conventional manner, that is, in a nitrogen atmosphere at 180° to 200° C. in the presence of a catalyst, raising the temperature to 240° to 280° C., and conducting condensation reaction at the temperature under a vacuum of 0.5 to 1 mmHg. The amount of maleic or fumaric acid added may be 1 to 40 mol %, and preferably 10 to 30 mol % of the acid reactant in consideration of crosslinking and radiation curing properties during preparation.

Examples of the thermoplastic resins which can be modified into radiation-curable resins will be described below.

(1) Vinyl Chloride Copolymers

Included are vinyl chloride-vinyl acetate-vinyl alcohol copolymers, vinyl chloride-vinyl alcohol copolymers, vinyl chloride-vinyl alcohol-vinyl propionate copolymers, vinyl chloride-vinyl acetate-maleic acid copolymers, vinyl chloride-vinyl acetate-vinyl alcohol-maleic acid copolymers, vinyl chloride-vinyl acetate-OH terminated, alkyl branched copolymers, for example, VROH, VYNC, VYEGX, VERR, VYES, VMCA, VAGH, UCARMMAG 520, and UCARMAG 528 (all trade names, manufactured by U.C.C.), and analogues. These copolymers may be modified to be radiation sensitive by incorporating acrylic, maleic, or allyl double bonds. They may additionally contain carboxylic units.

(2) Saturated Polyester Resins

Included are saturated polyesters obtained by esterifying saturated polybasic acids such as phthalic acid, isophthalic acid, terephthalic acid, succinic acid, aidpic acid, sebasic acid, etc. with polyhydric alcohols such as ethylene glycol, diethylene glycol, glycerine, trimethylolpropane, 1,2-propylene glycol, 1,3-butanediol, dipropylene glycol, 1,4-butanediol, 1,6-hexanediol, pentaerithritol, sorbitol, neopentyl glycol, 1,4-cyclohexanedimethanol, etc., and products obtained by modifying these resins with $SO_3Na$ or the like, for example, Vyron 53S (trade name, Toyobo K.K.). They may be modified to be radiation sensitive.

(3) Polyvinyl Alcohol Resins

Included are polyvinyl alcohol, butyral resins, acetal resins, formal resins, and copolymers of such units. They may be modified to be radiation sensitive by acting on a hydroxyl group in them.

(4) Epoxy Resins and Phenoxy Resins

Included are epoxy resins formed by reaction of bisphenol-A with epichlorohydrin and methyl epichlorohydrin, for example, Epicoat 152, 154, 828, 1001, 1004, and 1007 (trade names, manufactured by Shell Chemicals), DEN 431, DER 732, DER 511 and DER 331 (trade names, manufactured by Dow Chemicals), Epichlon 400 and 800 (trade names, manufactured by Dai-Nihon Ink K.K.); phenoxy resins which are epoxy resins having a high degree of polymerization, for example, PKHA, PKHC, and PKHH (trade names, manufactured by U.C.C.); and copolymers of brominated bisphenol-A with epichlorohydrin, for example, Epichlon 145, 152, 153, and 1120 (trade names, manufactured by Dai-Nihon Ink K.K.). Also included are carboxyl radical-containing derivatives of the foregoing resins. These resins may be modified to be radiation sensitive by using an epoxy group contained therein.

(5) Cellulosic Derivatives

A variety of cellulosic derivatives may be used although nitrocellulose, cellulose acetobutyrate, ethyl cellulose, butyl cellulose, acetyl cellulose, and analogues are preferred. These resins may be modified to be radiation sensitive by using a hydroxyl group contained therein.

Additional examples of the resins which can be subjected to radiation sensitive modification include polyfunctional polyester resins, polyether-ester resins, polyvinyl pyrrolidone resins and derivatives (e.g., PVP-olefin copolymers), polyamide resins, polyimide resins, phenol resins, spiro-acetal resins, and acrylic resins containing at least one hydroxyl-bearing acrylate or methacrylate as a polymer component.

Examples of the elastomers and prepolymers are presented below.

(1) Polyurethane Elastomers and Prepolymers

Polyurethanes are very useful because of abrasion resistance and adhesion to substrates, for example, PET films. Illustrative polyurethane elastomers and prepolymers are condensation polymerization products from (a) polyfunctional isocyanates such as 2,4-toluenediisocyanate, 2,6-toluenediisocyanate, 1,3-xylenediisocyanate, 1,4-xylenediisocyanate, 1,5-naphthalenediisocyanate, m-phenylenediisocyanate, p-phenylenediisocyanate, 3,3'-dimethyl-4,4'-diphenylmethane diisocyanate, 4,4'-diphenylmethane diisocyanate, 3,3'-dimethylbiphenylene diisocyanate, 4,4'-biphenylene diisocyanate, hexamethylene diisocyanate, isophorone diisocyanate, dicyclohexylmethane diisocyanate, Desmodur L, Desmodur N (trade names, manufactured by Farbenfabriken Bayer A.G.), etc.; and (b) linear saturated polyesters as produced through polycondensation from polyhydric alcohols (such as ethylene glycol, diethylene glycol, glycerine, trimethylol propane, 1,4-butanediol, 1,6-hexanediol, pentaerythritol, sorbitol, neopentylglycol, 1,4-cyclohexanedimethylol, etc.) and saturated polybasic acids (such as phthalic acid, isophthalic acid, terephthalic acid, succinic acid, adipic acid, sebasic acid, etc.); linear saturated polyethers such as polyethylene glycol, polypropylene glycol, and polytetramethylene glycol; caprolactam; polyesters such as hydroxyl-containing acrylates and hydroxyl-containing methacrylates, and the like. It is very useful to react the isocyanate or hydroxyl terminal group of these urethane elastomers with a monomer having an acrylic or allyl double bond to modify them to be radiation sensitive. Also included are those having an OH or COOH terminal group as a polar group.

Also included are monomers having active hydrogen capable of reacting with an isocyanate group and an unsaturated double bond capable of radiation curing, for example, mono- and diglycerides of long chain fatty acids having an unsaturated double bond.

rubbers and internally plasticized, saturated linear polyesters (commercially available as Vyron #300 from Toyobo K.K.) may also be useful provided that they are subjected to radiation sensitive modification.

The radiation-curable compounds having unsaturated double bonds which may be used as oligomers and monomers in the present invention include styrene, ethylacrylate, ethylene glycol diacrylate, ethylene glycol dimethacrylate, diethylene glycol acrylate, diethylene glycol dimethacrylate, 1,6-hexaneglycol diacrylate, 1,6-hexaneglycol dimethacrylate, N-vinylpyrrolidone, pentaerythritol tetraacrylate (and methacrylate), pentaerythritol triacrylate (and methacrylate), trimethylolpropane triacrylate, trimethylolpropane trimethacrylate, polyfunctional oligoester acrylates (e. g., Aronix M-7100, M-5400, 5500, 5700, etc., available from Toa Synthetic K.K.), acryl modified products of urethane elastomers (e.g., Nippolane 4040 available from Nippon Polyurethane K.K.), and the derivatives thereof having a functional group such as COOH incorporated therein, acrylates and methacrylates of trimethylolpropane diacrylate (methacrylate) phenol ethylene oxide adducts, compounds having a pentaerythritol fused ring represented by the following general formula and having an acryl or methacryl group or epsilon-caprolactone-acryl group attached thereto:

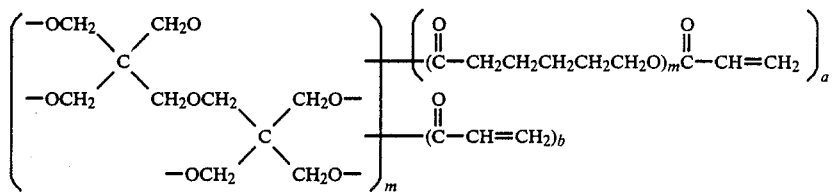

(2) Acrylonitrile-butadiene Copolymerized Elastomers

Acrylonitrile-butadiene copolymerized prepolymers having a hydroxyl terminal group commercially available as Poly BD Liquid Resin from Sinclair Petro-Chemical and elastomers commercially available as Hiker 1432J from Nihon Zeon K.K. are adequate because the double bond of a butadiene unit is capable of generating a radical upon exposure to radiation to facilitate crosslinking and polymerization.

(3) Polybutadiene Elastomer

Low molecular weight prepolymers having a hydroxyl terminal group commercially available as Poly BD Liquid Resin R-15 from Sinclair Petro-Chemical and the like are preferred because they are compatible with thermoplastic resins. R-15 prepolymers whose molecule is terminated with a hydroxyl group can be more radiation sensitive by adding an acrylic unsaturated double bond to the molecule end, which is more advantageous as a binder component.

Also, cyclic products of polybutadienes commercially available as CBR-M901 from Nihon Synthetic Rubber K.K. offer satisfactory quality when combined with thermoplastic resins.

Additional preferred examples of the thermoplastic elastomers and prepolymers include styrene-butadiene rubbers, chlorinated rubbers, acrylic rubbers, isoprene rubbers, and cyclic products thereof (commercially available as CIR 701 from Nihon Synthetic Rubber K.K.) while elastomers, for example, epoxy-modified for example, compound wherein m=1, a=2, and b=4 (to be referred to as special pentaerythritol condensate A, hereinafter), compound wherein m=1, a=3, and b=3 (to be referred to as special pentaerythritol condensate B, hereinafter), compound wherein m=1, a=6, and b=0 (to be referred to as special pentaerythritol condensate C, hereinafter), and compound wherein m=2, a=6, and b=0 (to be referred to as special pentaerythritol condensate D, hereinafter), and special acrylates represented by the following general formulae:

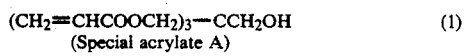 (1)
(Special acrylate A)
 (2)
(Special acrylate B)
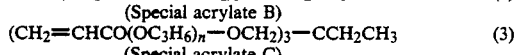 (3)
(Special acrylate C)

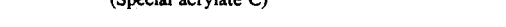
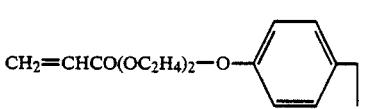
(Special acrylate D)

-continued

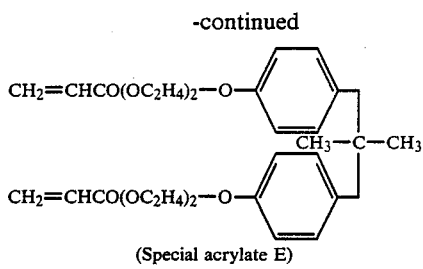

(Special acrylate E)

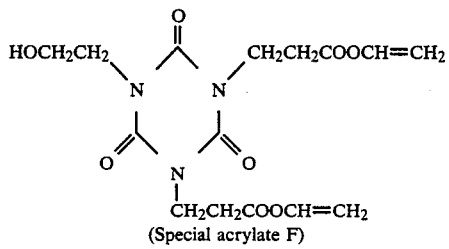

(Special acrylate F)

$$CH_3-(CH_2)_n-COOCH_2-\underset{\underset{CH_2COOCH=CH_2}{|}}{\overset{\overset{CH_2COOCH=CH_2}{|}}{C}}-CH_2OH$$

(n ≈ 16)
(Special acrylate G)

$CH_2=CHCOO-(CH_2CH_2O)_4-COCH=CH_2$ (8)
(Special acrylate H)

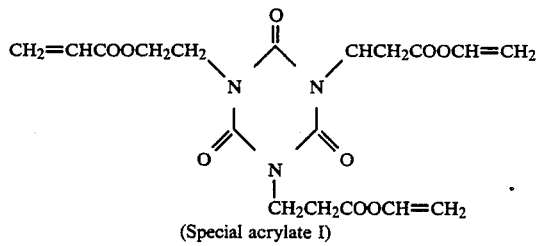

(Special acrylate I)

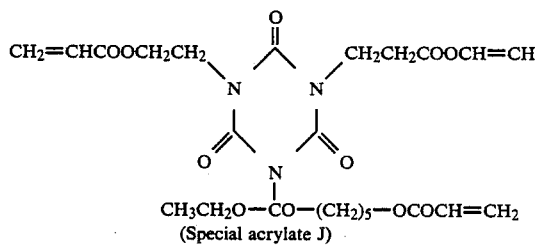

(Special acrylate J)

$$\underset{\text{(Special acrylate K)}}{A-(X-Y)_n^{\overset{A}{|}}X-A}$$

A: acrylic acid   X: polyhydric alcohol   Y: polybasic acid $A \leftarrow M-N \rightarrow_n M-A$ (12)
A: acrylic acid   M: dihydric alcohol   N: dibasic acid
(Special acrylate L)

Next, processes for the synthesis of the radiation curable binders will be described.

(a) Synthesis of Acryl-modified Products (Radiation Sensitive Modified Resins) of Vinyl Chloride-vinyl Acetate Copolymeric Resins A 5-liter four-necked flask is charged with 750 parts of a partially saponified vinyl chloride-vinyl acetate copolymer having an OH group (average polymerization degree n=500), 1250 parts of toluene, and 500 parts of cyclohexanone. After the flask is heated at 80° C. to dissolve the contents into a solution, 61.4 parts of 2-hydroxyethyl methacrylate adduct of tolylenediisocyanate (the preparation thereof will be described later) is added and then, 0.012 parts of tin octylate and 0.012 parts of hydroquinone are added. Reaction is continued in a nitrogen stream at 80° C. until the reaction rate of NCO reaches 90%. At the end of reaction, the reaction solution is cooled and 1250 parts of methyl ethyl ketone is added for dilution.

Preparation of 2-hydroxylethyl Methacrylate (2HEMA) Adduct of Tolylenediisocyanate (TDI)

In a 1-liter four-necked flask, 348 parts of TDI is heated at 80° C. in a nitrogen stream. A mixture of 260 parts of 2-ethylene methacrylate, 0.07 parts of tin octylate, and 0.05 parts of hydroquinone is then added dropwise while the reactor is cooled so as to control the temperature to 80° to 85° C. After the dropwide addition, the reaction is continued to completion at 80° C. for 3 hours with stirring. At the end of reaction, the contents are taken out of the flask and cooled, obtaining a white paste-like product which is 2HEMA adduct of TDI based on the preparation method.

(b) Synthesis of Acryl-modified Products (Radiation Sensitive Modified Resins) of Butyral Resins A 5-liter four-necked flask is charged with 100 parts of a butyral resin (BM-S, manufactured by Sekisui Chemicals K.K.), 191.2 parts of toluene, and 71.4 parts of cyclohexanone. After the flask is heated at 80° C. to dissolve the contents into a solution, 7.4 parts of 2HEMA adduct of TDI (synthesized as above) is added and then, 0.015 parts of tin octylate and 0.015 parts of hydroquinone are added. Reaction is continued in a nitrogen stream at 80° C. until the reaction rate of NCO reaches or exceeds 90%. At the end of reaction, the reaction solution is cooled and an amount of methyl ethyl ketone is added for dilution.

(c) Synthesis of Acryl-modified Products (Radiation Sensitive Modified Resins) of Saturated Polyester Resins A flask is charged with 100 parts of a saturated polyester resin (Vyron RV-200, manufactured by Toyobo K.K.), 116 parts of toluene, and 116 parts of methyl ethyl ketone. After the flask is heated at 80° C. to dissolve the contents into a solution, 3.55 parts of 2HEMA adduct of TDI (synthesized as above) is added and then, 0.007 parts of tin octylate and 0.007 parts of hydroquinone are added. Reaction is continued in a nitrogen stream at 80° C. until the reaction rate of NCO reaches or exceeds 90%.

(d-1) Synthesis of Acryl-modified Products (Radiation Sensitive Modified Resins) of Epoxy Resins After 400 parts of an epoxy resin (Epicoat 1007, manufactured by Shell Chemicals) is dissolved in 50 parts of toluene and 50 parts of methyl ethyl ketone by heating, 0.006 parts of N,N-dimethylbenzylamine and 0.003 parts of hydroquinone are added. The temperature is raised to 80° C. and 69 parts of acrylic acid is added dropwise. Reaction is continued at 80° C. until the acid value is lowered to below 5.

(d-2) Synthesis of Acryl-modified Products (Radiation Sensitive Modified Resins) of Phenoxy Resins A 3-liter four-necked flask is charged with 600 parts of an OH group-bearing phenoxy resin (PKHH manufactured by U.C.C., molecular weight 30,000) and 1,800 parts of methyl ethyl ketone. After the flask is heated at 80° C. to dissolve the contents into a solution, 6.0 parts of 2HEMA adduct of TDI (synthesized as above) is added and then, 0.012 parts of tin octylate and 0.012 parts of hydroquinone are added. Reaction is continued in a nitrogen stream at 80° C. until the reaction rate of NCO reaches or exceeds 90%. The resultant modified phenoxy product has a molecular weight of 35,000 and one double bond per molecule.

(e) Synthesis of Acryl-modified Products (Radiation Sensitive Modified Resins) of Urethane Elastomers A reactor is charged with 250 parts of a urethane prepolymer of isocyanate-terminated diphenylmethane diisocyanate (MDI) type (Nippolane 3119 manufactured by Nippon Polyurethane K.K.), 32.5 parts of 2HEMA, 0.07 parts of hydroquinone, and 0.009 parts of tin octylate and heated at 80° C. to dissolve the contents into a solution. While the reactor is cooled so as to control the temperature to 80° to 90° C., 43.5 parts of TDI is added dropwise. At the end of addition, reaction is continued at 80° C. until the reaction rate reaches or exceeds 95%.

(f) Synthesis of Acryl-modified Products (Radiation Sensitive Modified Elastomers) of Terminally Urethane-modified Polyether Elastomers A reactor is charged with 250 parts of a polyether (PTG-500 manufactured by Nippon Polyurethane K.K.), 32.5 parts of 2HEMA, 0.07 parts of hydroquinone, and 0.009 parts of tin octylate and heated at 80° C. to dissolve the contents into a solution. While the reactor is cooled so as to control the temperature to 80° to 90° C., 43.5 parts of TDI is added dropwise. At the end of addition, reaction is continued at 80° C. until the reaction rate reaches or exceeds 95%.

(g) Synthesis of Acryl-modified Products (Radiation Sensitive Modified Elastomers) of Polybutadiene Elastomers A reactor is charged with 250 parts of a low-molecular weight, hydroxyl-terminated polybutadiene (Poly BD Liquid Resin R-15, manufactured by Sinclair Petro-Chemical), 32.5 parts of 2HEMA, 0.07 parts of hydroquinone, and 0.009 parts of tin octylate and heated at 80° C. to dissolve the contents into a solution. While the reactor is cooled so as to control the temperature to 80° to 90° C., 43.5 parts of TDI is added dropwise. At the end of addition, reaction is continued at 80° C. until the reaction rate reaches or exceeds 95%.

Among known polymers, polymers of one type degrade while polymers of another type give rise to crosslinking between molecules upon exposure to radiation. Included in the crosslinking type are polyethylene, polypropylene, polystyrene, polyacrylate, polyacrylamide, polyvinyl chloride, polyester, polyvinyl pyrrolidone rubber, polyvinyl alcohol, and polyacrolein. Since these polymers of the crosslinking type give rise to crosslinking reaction without any particular modification as previously described, they may also be used as the radiation-curable binder as well as the above-mentioned modified products.

These radiation-curable resins may be cured by any of various well-known methods.

When curing is effected with ultraviolet radiation, a photo polymerization sensitizer may be added to the radiation curable compounds as mentioned above.

The photo polymerization sensitizers used herein may be selected from well-known sensitizers. Examples of such sensitizers include benzoins such as benzoin methyl ether, benzoin ethyl ether, α-methylbenzoin, α-chlorodeoxybenzoin, etc.; ketones such as benzophenone, acetophenone, bis(dialkylamino)benzophenones; quinones such as anthraquinone and phenanthraquinone; and sulfides such as benzyl sulfide, tetramethylthiuram monosulfide, etc. The photo polymerization sensitizers may be added in amounts of 0.1 to 10% by weight based on the resin solids.

For exposure to ultraviolet radiation there may be used UV lamps such as xenon discharge lamps and hydrogen discharge lamps.

Electron radiation may also be used. Preferably, a radiation accelerator is operated at an accelerating voltage of 100 to 750 kV, more preferably 150 to 300 kV to generate radiation having a sufficient penetrating power such that the object is exposed to a radiation dose of 0.5 to 20 megarad.

Particularly preferred types of radiation for exposure include radiation generated by a radiation accelerator and ultraviolet radiation because of ease of control of a dose, simple incorporation in a manufacturing line, and electromagnetic radiation shielding.

The radiation curing process allows solventless resin compositions to cure within a short time and thus, such solvent-free resin compositions may be conveniently used in the practice of the present invention.

The use of radiation-curable resins prevents a roll of tape having a large diameter known as a jumbo roll from being tightened. Then no substantial difference in electromagnetic properties is induced between the outside and inside coils of the jumbo roll, resulting in improved properties. Besides, productivity is improved since curing can be carried out as an on-line operation in magnetic tape production.

Magnetic Composition

Preferably, the weight ratio of powder magnetic material to binder ranges from 1/1 to 9/1, and more preferably from 2/1 to 8/1. Weight ratios of lower than 1/1 result in a low saturation magnetic flux density. At ratios of higher than 9/1, the powder magnetic material cannot be well dispersed in the binder so that the resulting coating is rough at the surface and brittle.

A non-reactive solvent may optionally be used in the practice of the present invention. No particular limit is imposed on the non-reactive solvent and a suitable solvent may be chosen by taking into account the solubility of and compatibility with the binder. Some illustrative non-limiting examples of the non-reactive solvents include ketones such as acetone, methyl ethyl ketone, methyl isobutyl ketone, cyclohexanone, etc.; esters such as ethyl formate, ethyl acetate, butyl acetate, etc.; alcohols such as methanol, ethanol, isopropanol, butanol, etc.; aromatic hydrocarbons such as toluene, xylene, ethylbenzene, etc.; ethers such as isopropyl ether, ethyl ether, dioxane, etc.; and furans such as tetrahydrofuran, furfural, etc., alone or in admixture. The solvents may be used in amounts of 10 to 10,000% by weight, preferably 100 to 5,000% by weight based on the binder.

The magnetic layer may further contain an inorganic pigment. Some illustrative non-limiting examples of the inorganic pigments includes electroconductive pigments such as carbon black, graphite, and graphitized carbon black; and inorganic fillers such as $SiO_2$, $TiO_2$, $Al_2O_3$, $Cr_2O_3$, SiC, CaO, $CaCO_3$, zinc oxide, goethite, $\gamma$-$Fe_2O_3$, talc, kaolin, $CaSO_4$, boron nitride, graphite fluoride, molybdenum disulfide, and ZnS. Also employable are finely divided pigments such as aerosil and colloidal pigments including $SiO_2$, $Al_2O_3$, $TiO_2$, $ZrO_2$, $Cr_2O_3$, $Y_2O_3$, $CeO_2$, $Fe_3O_4$, $Fe_2O_3$, $ZrSiO_4$, $Sb_2O_5$, $SnO_2$, etc. Typical forms of these finely divided pigments are, in the case of $SiO_2$, for example, (1) colloidal solutions of ultrafine silicic acid anhydride (e.g., Snowtex, aqueous methanol silica sol manufactured by Nissan Chemicals K.K.) and (2) ultrafine anhydrous silicas prepared by pyrolysis of pure silicon tetrachloride (standard product 100 Å; Aerosil manufactured by Nihon Aerosil K.K.). Aluminum oxide, titanium oxide, and the aforementioned finely divided pigments may also be in the form of either (1) colloidal solution of ultrafine particles or (2) ultrafine particulates prepared by a gas phase process as mentioned above for silicon dioxide.

These inorganic pigments may be used in amounts of about 1 to 30 parts by weight for form (1) and 1 to 30 parts by weight for form (2) per 100 parts by weight of the binder. The use of the inorganic pigments in excess amounts results in a brittle coating which produces more dropouts.

The inorganic pigments may preferably have a diameter of up to 0.1 μm, more preferably up to 0.05 μm for form (1) and up to 0.7 μm, more preferably up to 0.5 μm for form (2).

The magnetic layer may further contain a dispersant. Some illustrative non-limiting examples of the dispersants include organic titanium coupling agents, silane coupling agents, and surface active agents, for example, natural surface active agents also serving as an antistatic agent, such as saponin; nonionic surface active agents such as alkylene oxide, glycerine, and glycidol surface active agents; cationic surface active agents such as higher alkyl amines, quaternary ammonium salts, heterocyclic compounds (e.g. pyridine), phosphoniums and sulfoniums; anionic surface active agents containing an acidic radical such as carboxylic acid, sulfonic acid, phosphoric acid, sulfate ester radicals, and phosphate ester radicals; and amphoteric surface active agents such as amino acids, aminosulfonic acids, sulfates and phosphates of amino alcohols.

The magnetic layer may further contain a lubricant. The lubricants used herein include well-known lubricants commonly used in magnetic recording media of the type, for example, silicone oils, fluoride oils, fatty acids, fatty acid esters, paraffins, liquid paraffins, and various surface active agents, with the fatty acids and/or fatty acid esters being preferred. Some illustrative non-limiting examples of the fatty acids include fatty acids containing at least 8 carbon atoms represented by RCOOH wherein R is an alkyl group having at least 7 carbon atoms, for example, caprylic acid, capric acid, lauric acid, myristic acid, palmitic acid, stearic acid, behenic acid, oleic acid, elaidic acid, linolic acid, linoleic acid, and stearolic acid; and examples of the fatty acid esters include fatty acid esters of a monobasic fatty acid having 12 to 16 carbon atoms with a monohydric alcohol having 3 to 12 carbon atoms and fatty acid esters of a monobasic fatty acid having at least 17 carbon atoms with a monohydric alcohol providing a total of 21 to 23 carbon atoms together with the fatty acid. Also employable are metal soaps in the form of alkali and alkaline earth metal salts of the aforementioned fatty acids and lecithin.

Silicones used may be those modified with a fatty acid and those partially modified with fluoride. Alcohols used may be higher alcohols. Fluorides used may be those prepared by electrolytic substitution, teromerization and oligomerization processes.

Among other lubricants, radiation-curable lubricants may conveniently be used. The use of such curable lubricants prevents the transfer of the morphology of the front surface to the rear surface adjoined in roll form, affording some advantages of reduced dropouts, minimized difference in output between the outside and inside coils of a roll of tape, and on-line production.

Examples of the radiation-curable lubricants include compounds containing a molecular chain capable of lubrication and an acrylic double bond in their molecule, for example, acrylates, methacrylates, vinyl acetate, acrylic acid amides, vinyl alcohol esters, methyl vinyl alcohol esters, allyl alcohol esters, glycerides, and the like. These lubricants may be represented by the following structural formulae:

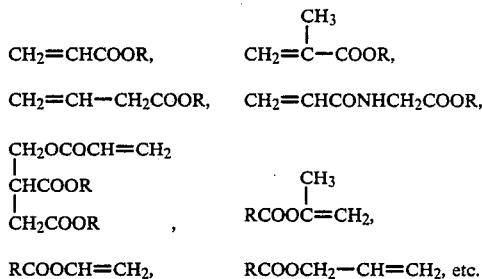

wherein R is a straight or branched, saturated or unsaturated hydrocarbon radical having at least 7 carbon atoms, preferably from 12 to 23 carbon atoms.

They may be fluoride substituted lubricants, which may be represented by the following structural formulae:

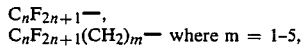

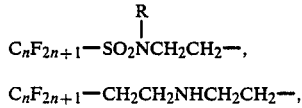

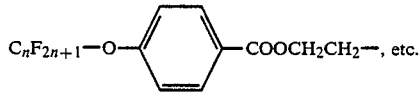

Some preferre examples of these radiation-curable lubricants include stearic acid methacrylate (acrylate), methacrylate (acrylate) of stearyl alcohol, methacrylate (acrylate) of glycerine, methacrylate (acrylate) of glycol, and methacrylate (acrylate) of silicone.

The dispersant and the lubricant each may be used in amounts of about 0.1 to 20 parts by weight per 100 parts by weight of the binder.

The substrates used herein may include films and plates of plastic materials, for example, polyesters such as polyethylene terephthalate, polyolefines such as polypropylene, cellulose derivatives such as cellulose triacetate, polyimides, polycarbonates, polysulfones, polyethylene naphthalate, aromatic aramides, aromatic polyesters; and plates of inorganic materials, for example, metal plates such as aluminum plates and glass plates, but not limited thereto. Preferred among these are polyesters, polyamides, and polyimides.

Generally, the magnetic recording medium of the present invention may have two magnetic layers on the opposite major surfaces of a substrate. Typical examples of the double sided recording media are floppy disks and hard disks.

If desired, the magnetic recording medium of the present invention may be provided with an undercoat, a backcoat, and/or a topcoat each formed from a commonly used composition in an ordinary fashion. The backcoat, if formed, may preferably have a composition comprised of a binder, a pigment, and a lubricant.

In the magnetic recording medium of the present invention, a high magnetic permeability metal thin film, for example, of Permalloy, and/or an undercoat of any resinous composition may be interposed between the substrate and the magnetic layer.

The undercoat layer may have a composition comprising a thermosetting resin or a radiation-curable compound and any desired additives such as conductive pigments, inorganic fillers, lubricants, and dispersants or surface active agents.

The preferred conductive pigment is carbon black. As exemplary of the carbon black there may be given furnace black, channel black, acetylene black, thermal black, and lamp black, and other carbon blacks prepared by any known processes, with the acetylene black, furnace black, channel black, roller and disk black, and German naphthalin blacks being most preferred.

The carbon blacks may have a particle diameter which is not particularly limited, but preferably ranges from 10 to 100 mμm, more preferably from 10 to 80 mμm as measured by electron microscopic analysis. Carbon black having a particle diameter of more than 100 mμm provides an undercoat with a rough surface contributing to a reduction in the electromagnetic properties of the magnetic layer subsequently applied thereon. Finer carbon black particles of less than 10 mμm in diameter are difficult to uniformly disperse, also resulting in an undercoat having a rough surface.

The carbon black may preferably be used in amounts of about 5 to 200 parts by weight, more preferably about 20 to 200 parts by weight per 100 parts by weight of the binder. It may also be contained in the backcoat layer.

A special type of carbon black is graphitized carbon black which may also be used in the practice of the present invention.

The provision of such an undercoat layer prevents adherence of the medium to a head to be contacted during recording and reproducing operations, adherence of the medium to a guide roller or calender roll to be contacted during manufacturing processes, typically a coating process, and occurrence of discharge noise.

The undercoat layer preferably has a thickness of about 10 Å to about 5 μm.

When a magnetic layer is formed on each major surface of a substrate, the undercoat layer may also be formed on each of the major surfaces.

Preparation

The magnetic recording medium of the present invention may be prepared by a conventional well-known process. For example, it is prepared by mixing and dispersing magnetic powder in an organic solvent along with a binder to form a magnetic coating composition, applying the composition to a substrate such as a polyester film by any desired techniques including gravure coating, reverse roll coating, air knife coating, air doctor coating, blade coating, kiss coating, and spraying, subjecting to an optional orientation treatment in a horizontal or perpendicular magnetic field, drying the coating, and hardening the coating as by curing with radiation in the case of a radiation-curable resin binder. Thereafter, the medium may be provided with a backcoat and/or topcoat layer if necessary.

The orientation treatment may be in accord with a conventional well-known method as long as the desired perpendicular rectangular ratio and coercive force are obtained. There are available a number of orienting methods using a permanent magnet, DC magnetic field, and AC magnetic field, and combinations thereof, for example, a combination of vertical and horizontal magnetic fields, a combination of a permanent magnet or DC magnetic field with an AC magnetic field. Also employable are mechanical orientation and combinations of mechanical orientation with any of the foregoing methods. Preferred in the practice of the present invention are mechanical orientation and horizontal orientation. The orienting magnetic field preferably has a strength of 1,000 to 6,000 Gauss.

Magnetic head

In general, coating type magnetic recording media are advantageous over thin film type magnetic recording media in that the coating type may be operated with ring-type heads which have been long used in practice and highly evaluated because of their stability. The coating type magnetic recording media of the present invention also enjoy this advantage. More advantageously, the media of the present invention can be operated with advanced ferrite heads because of their low coercive force Hc in a perpendicular direction.

It should be noted that the gap of a ring-type head affects the overwriting ability and linear recording density D50 of media. The head should preferably have a gap of 0.35 to 0.5 μm, more preferably 0.4 to 0.5 μm long. The linear recording density D50 is deteriorated with longer gaps whereas the overwriting ability becomes poor with shorter gaps.

The magnetic recording media of the present invention are characterized by excellent magnetic properties including high linear recording density and output, and possesses excellent runnability or durability and overwriting ability.

The magnetic recording media of the present invention are thus useful as floppy disks, audio disks, video disks, video floppies, image files, computer disks, magnetic disks, magnetic cards and the like. They find the best application as floppy disks, computer disks, and magnetic disks.

EXAMPLES

In order that those skilled in the art will better understand the practice of the present invention, examples of the present invention will be described below. Several abbreviations are used, for example, Hc is coercive force in oersted, MW is molecular weight, PET is polyethylene terephthalate, MEK is methyl ethyl ketone, and MIBK is methyl isobutyl ketone.

EXAMPLE 1

A polyester (PET) film of 75 μm thick was coated on both the front and back surfaces with an undercoat layer having the following composition.

| Undercoat composition | Parts by weight |
| --- | --- |
| $CaCO_3$ (50 mμm) | 10 |
| Graphitized carbon (20 mμm) | 30 |
| Vinyl chloride-vinyl alcohol copolymer* | 50 |
| Polyurethane elastomer** | 50 |
| Stearic acid | 2 |
| Butyl stearate | 2 |
| Mixed solvent (1/1 MIBK/toluene) | 300 |

*trademark VAGH manufactured by Union Carbide
**trademark Estan 5703 manufactured by BF Goodrich The mixture was milled for dispersion for 5 hours in a ball mill and combined with 20 parts by weight of an isocyanate compound (trademark Collonate L manufactured by Nihon Polyurethane K.K.). The composition was applied onto the PET film so as to give a dry thickness of 3 μm. The coating was surface smoothened and set by heating at 80° C. for 48 hours.

Various samples were prepared by forming magnetic layers on both the undercoats from a magnetic coating composition as formulated below.

The magnetic powders used were hexagonal plate-shaped barium ferrites (represented by $BaFe_{12}O_{19}$ having Ba and Fe partially replaced by Co and Ti or Zr and Cu and synthesized by a hydrothermal reaction process) having different coercive forces shown below.

| Magnetic powder | Substitute metal (%) Co | Substitute metal (%) Ti | Coercive force (Oe) |
| --- | --- | --- | --- |
| BF 11 | 8 | 3 | 650 |
| BF 12 | 10 | 3 | 550 |
| BF 13 | 10 | 4 | 450 |
| BF 14 | 11 | 4 | 400 |
| BF 15 | 11 | 5 | 350 |

The magnetic powders BF 11-15 had an average particle diameter and average flakiness as shown in Table 1. The atomic percent of the substitute metals were analyzed by X-ray fluorometry and calculated on the assumption that Fe was 100%.

At the outset, a magnetic base having the following composition was prepared using each of these magnetic powders.

| Ingredient | Parts by weight |
| --- | --- |
| Barium ferrite | 120 |
| $\alpha\text{-}Al_2O_3$ (particulate, 0.5 μm) | 2 |
| Carbon black (20 mμm) | 10 |
| Solvent (50/50 MEK/toluene) | 100 |

These ingredients were milled for 3 hours in a ball mill to fully wet the barium ferrite.

A binder composition was prepared by milling the following ingredients.

| Binder composition | Parts by weight |
| --- | --- |
| Vinyl chloride-vinyl acetate-vinyl | 15 (solids) |

| Binder composition | Parts by weight |
| --- | --- |
| alcohol copolymer* | |
| Polyurethane** | 15 (solids) |
| Solvent (70/30 MEK/cyclohexanone | 200 |
| Higher fatty acid-modified silicone oil | 3 |
| Butyl myristate | 3 |

*trademark UCARMAG 528 manufactured by Union Carbide
**trademark Nippolane 3022 manufactured by Nihon Polyurethane K.K.

The binder composition was added to the magnetic paint base in the ball mill and milled for dispersion for a further 42 hours. To the dispersion was added 5 parts by weight calculated as solids of an isocyanate compound (trademark Collonate L manufactured by Nihon Polyurethane K.K.).

The resulting magnetic coating composition was applied onto the undercoats by gravure coating and subjected to one of the following orientation treatments OT 11-31.

Orientation Treatment

OT 11

No magnetic orientation was conducted.

OT 12

The coating was subjected to orientation in a perpendicular magnetic field having a strength of 1,500 G while drying.

OT 13

The coating was subjected to orientation in a perpendicular magnetic field having a strength of 2,500 G while drying.

OT 14

The coating was subjected to orientation in a perpendicular magnetic field having a strength of 3,000 G while drying.

OT 15

OT 14 plus calendering under a higher pressure.

OT 16

The coating was subjected to orientation in a perpendicular magnetic field using N-S opposed main magnets (3,000 G) having yokes attached to their inlet side while drying.

OT 17

Same as OT 16, but at a higher coating speed and a higher magnetic field strength.

After passage through the magnetic field, the coated film was continuously dried with hot air or under a far infrared lamp to drive off the solvent, subjected to a surface smoothening, and then set by heating at 80° C. for 48 hours. At the end of curing, the coating or magnetic layer had a thickness of 1.5 μm as measured by means of an electron micrometer. The coatings of magnetic composition were formed on both the major surfaces of the film to produce a double-sided magnetic recording medium.

The thus prepared samples are designated Sample Nos. 101 through 115 (see Table 1). These samples were measured for various properties, that is, perpendicular coercive force $Hc_\perp$, rectangular ratio $Br_\perp/Bm_\perp$, runnability, overwriting ability, and linear recording density D50. Evaluation was made as follows.

Perpendicular Rectangular Ratio

The rectangular ratio $Br_\perp/Bm_\perp$ of a magnetic recording medium sample in a perpendicular direction was measured and corrected for a demagnetizing field. When the sample had a magnetic layer on either surface of a substrate, each of the magnetic layers was measured.

Runnability

A sample was operated in a current floppy disk drive at room temperature. Samples withstanding more than $200 \times 10^5$ passes are evaluated as having good runnability, and samples withstanding more than $300 \times 10^5$ passes are evaluated as having better runnability.

Overwriting Ability

Rectangular waves of 10 KFRPI were written in a sample by means of a ring-type head having a gap of 0.4 μm and then waves of 20 KFRPI were written thereover. An output difference was measured. A higher output difference is evaluated as better overwriting ability. It was observed that no error would occur upon overwriting if an output difference of higher than 25 dB was available in the overwriting measurement, but a writing error could occur at an output difference of 25 dB and the writing error rate increased as the output difference became smaller.

Linear Recording Density D50 (KFRPI)

The linear recording density D50 (KFRPI) of a sample at which the sample reduces its output (E) produced in a low recording density region to one-half (E/2) in a high recording density region was determined at 300 revolutions per minute using a ferrite head with a gap of 0.4 μm. The practically permissible D50 is at least 50 KFRPI, especially 55 KFRPI.

The results are shown in Table 1.

TABLE 1

| Sample No. | Magnetic powder | Particle diameter (μm) | Flakiness | Orientation | $Hc_\perp$ (Oe) | $Br_\perp/Bm_\perp$ | Runnability ($\times 10^5$ passes) | Overwrite (dB) | D50 (KFRPI) |
|---|---|---|---|---|---|---|---|---|---|
| 101 | BF 11 | 0.12 | 34 | OT 11 | 700 | 0.73 | 300 | −27 | 58 |
| 102 | BF 11 | 0.12 | 34 | OT 12 | 700 | 0.79 | 390 | −26 | 58 |
| 103* | BF 11 | 0.12 | 34 | OT 13 | 700 | 0.83 | 390 | −25 | 61 |
| 104 | BF 12 | 0.12 | 34 | OT 11 | 600 | 0.73 | 300 | −31 | 58 |
| 105 | BF 12 | 0.12 | 34 | OT 12 | 600 | 0.83 | 390 | −27 | 60 |
| 106 | BF 12 | 0.12 | 34 | OT 13 | 600 | 0.88 | 390 | −26 | 62 |
| 107* | BF 12 | 0.12 | 34 | OT 14 | 600 | 0.98 | 390 | −24 | 63 |
| 108 | BF 13 | 0.12 | 34 | OT 12 | 500 | 0.83 | 370 | −28 | 56 |
| 109 | BF 14 | 0.12 | 34 | OT 12 | 450 | 0.83 | 360 | −29 | 54 |
| 110 | BF 15 | 0.12 | 34 | OT 12 | 400 | 0.83 | 350 | −30 | 51 |
| 111 | BF 11 | 0.07 | 4 | OT 15 | 700 | 0.79 | 270 | −27 | 58 |
| 112* | BF 11 | 0.07 | 4 | OT 16 | 700 | 0.83 | 270 | −25 | 59 |
| 113 | BF 12 | 0.07 | 4 | OT 14 | 600 | 0.73 | 200 | −31 | 56 |
| 114* | BF 12 | 0.07 | 4 | OT 17 | 600 | 0.98 | 270 | −24 | 62 |
| 115 | BF 13 | 0.07 | 4 | OT 15 | 500 | 0.83 | 250 | −28 | 54 |

*comparison

EXAMPLE 2

Another series of disk samples were prepared by the same procedure as in Example 1 except that the magnetic powders used were BF 21–24 having different compositions and hence, difference coercive forces as shown below. Magnetic powders BF 21–24 had an average particle diameter and an average flakiness as reported in Table 2.

| Magnetic powder | Substitute metal (%) | | Coercive force (Oe) |
|---|---|---|---|
| | Co | Ti | |
| BF 21 | 6 | 2 | 800 |
| BF 22 | 7 | 2 | 700 |
| BF 23 | 9 | 3 | 600 |
| BF 24 | Cu 2 | Zr 13 | 650 |

The magnetic orientation was OT 11 for all the samples.

The samples were determined for perpendicular rectangular ratio, overwriting ability, linear recording density D50 by the same procedures as described in Example 1.

TABLE 2

| Sample No. | Magnetic powder | Particle diameter (μm) | Flakiness | Orientation | $Hc_\perp$ (Oe) | $Br_\perp/Bm_\perp$ | Overwrite (dB) | D50 (KFRPI) |
|---|---|---|---|---|---|---|---|---|
| 201* | BF 21 | 0.11 | 16 | OT 11 | 850 | 0.69 | −25 | 57 |
| 202 | BF 22 | 0.11 | 16 | OT 11 | 750 | 0.69 | −27 | 57 |
| 203 | BF 23 | 0.11 | 16 | OT 11 | 650 | 0.69 | −29 | 56 |
| 204 | BF 14 | 0.11 | 16 | OT 11 | 450 | 0.69 | −31 | 51 |
| 205 | BF 24 | 0.12 | 34 | OT 11 | 700 | 0.73 | −27 | 58 |
| 206 | BF 24 | 0.12 | 8 | OT 11 | 700 | 0.62 | −28 | 55 |
| 207* | BF 21 | 0.07 | 4 | OT 11 | 850 | 0.58 | −23 | 54 |
| 208 | BF 22 | 0.07 | 4 | OT 11 | 750 | 0.58 | −27 | 54 |
| 209 | BF 12 | 0.07 | 4 | OT 11 | 600 | 0.58 | −31 | 54 |
| 210 | BF 23 | 0.06 | 5 | OT 11 | 700 | 0.58 | −29 | 54 |

*comparison

EXAMPLE 3

A polyester (PET) film of 75 μm thick was coated on both the front and back surfaces with an undercoat layer having the following composition.

| Undercoat composition | Parts by weight |
| --- | --- |
| Carbon black (20 mμm) | 50 |
| (A) acryl-modified vinyl chloride-vinyl acetate-vinyl alcohol copolymer (MW = 45,000) | 45 |
| (B) acryl-modified polyurethane elastomer (MW = 5,000) | 45 |
| (C) Pentaerythritol triacrylate | 10 |
| Stearic acid | 2 |
| Butyl stearate | 2 |
| Mixed solvent (1/1 MIBK/toluene) | 300 |

The mixture was milled for dispersion for 5 hours in a ball mill and applied onto the PET film so as to give a dry thickness of 0.7 μm. The coating was surface smoothened and exposed to electron radiation in a nitrogen atmosphere by means of an electron-curtain type electron accelerator (manufactured by ESI) operating under an accelerating voltage of 150 keV and an electrode current of 10 mA to an adsorption dose of 5 Mrad, thereby curing the coating to form an undercoat.

Various samples were prepared by forming magnetic layers on both the undercoats from a magnetic coating composition as formulated below.

At the outset, a magnetic base having the following composition was prepared using hexagonal plate-shaped barium ferrites (represented by $BaFe_{12}O_{19}$ having Ba and Fe partially replaced by Co and Ti and synthesized by a hydrothermal reaction process) similar to those used in Example 1 and having the average particle diameter and flakiness shown in Table 3.

| Ingredient | Parts by weight |
| --- | --- |
| Barium ferrite | 120 |
| α-$Al_2O_3$ (particulate, 0.5 μm) | 2 |
| Carbon black (20 mμm) | 10 |
| Solvent (50/50 MEK/toluene) | 100 |

These ingredients were milled for 3 hours in a ball mill to fully wet the barium ferrite. Separately, a binder composition was prepared by fully mixing the following ingredients into a solution.

| Ingredient | Parts by weight |
| --- | --- |
| Vinyl chloride-vinyl acetate-vinyl alcohol copolymer (containing 1% maleic acid, MW = 40,000) | 8 (solids) |
| Acrylic double bond-incorporated vinyl chloride-vinyl acetate copolymer (containing 1% maleic acid, MW = 20,000) | 10 (solids) |
| Acrylic double bond-incorporated polyether urethane elastomer (MW = 40,000) | 9 (solids) |
| Pentaerythritol triacrylate | 3 |
| Solvent (50/50 MEK/toluene) | 200 |
| Stearic acid | 4 |
| Butyl stearate | 2 |

The binder composition was added to the magnetic base in the ball mill and milled for dispersion for a further 42 hours. The thus obtained magnetic coating composition was applied onto the undercoats by gravure coating. The coated film was continuously moved through a magnetic field to effect orientation. After passage through the magnetic field, the coated film was continuously dried with hot air or under a far infrared lamp to drive off the solvent, subjected to a surface smoothening, and then exposed to electron radiation in a nitrogen atmosphere by means of an electron-curtain type electron accelerator (manufactured by ESI) operating under an accelerating voltage of 150 keV and an electrode current of 20 mA to a total dose of 5 Mrad, thereby curing the coating. At the end of drying, the coating or magnetic layer had a thickness as reported in Table 3, the film thickness being measured by means of an electron micrometer. The coatings of magnetic coating composition were formed on both the major surfaces of the film to produce a double-sided magnetic film.

The thus prepared samples are designated Sample Nos. 301 through 308 (see Table 3). These samples were measured for various properties, that is, perpendicular coercive force, rectangular ratio, runnability, overwriting ability, and D50 by the same procedures as in Example 1.

The results are shown in Table 3.

TABLE 3

| Sample No. | Magnetic powder | Particle diameter (μm) | Flakiness | Thickness (μm) | Orientation | $Hc_\perp$ (Oe) | $Br_\perp/Bm_\perp$ | Overwrite (dB) | D50 (KFRPI) |
| --- | --- | --- | --- | --- | --- | --- | --- | --- | --- |
| 301 | BF 12 | 0.08 | 8 | 1.8 | OT 11 | 600 | 0.77 | −26 | 58 |
| 302 | BF 12 | 0.08 | 8 | 1.6 | OT 11 | 600 | 0.78 | −27 | 59 |
| 303 | BF 12 | 0.08 | 8 | 1.4 | OT 11 | 600 | 0.79 | −27 | 60 |
| 304 | BF 12 | 0.08 | 8 | 0.8 | OT 11 | 600 | 0.83 | −28 | 64 |
| 305 | BF 12 | 0.08 | 8 | 0.6 | OT 11 | 600 | 0.85 | −30 | 66 |
| 306 | BF 12 | 0.08 | 8 | 0.4 | OT 11 | 600 | 0.86 | −30 | 67 (somewhat poor envelope properties |
| 307* | BF 12 | 0.08 | 8 | 0.2 | OT 11 | 600 | 0.87 | −33 | poor envelope properties |
| 308* | BF 12 | 0.08 | 8 | 2.2 | OT 11 | 600 | 0.75 | −24 | 57 |

*comparison

EXAMPLE 4

Magnetic recording medium samples were prepared by the same procedure as in Example 1 using the same PET film and undercoat layers except that the magnetic layer was changed.

Magnetic powder BF23 was used, that is, hexagonal plate-shaped barium ferrites represented by $BaFe_{12}O_{19}$ having Ba and Fe partially replaced by 9% Co and 3% Ti, possessing a coerceive force of 600 Oe, and having the average particle diameter and average flakiness shown in Table 3. Other ingredients of the magnetic composition and preparation procedures were substantially the same as in Example 1 except that the following binder composition was used and the orientation treatment was selected from orientation treatments OT 11–17 previously mentioned and an additional orientation treatment OT 18.

OT 18

The coating was subjected to orientation in a perpendicular magnetic field using N-S opposed main magnets (3,000 G) having two opposed sets of ten serially arranged auxiliary magnets on their inlet side while drying.

The magnetic layer had a thickness of 1.5 μm at the end of drying.

| Binder composition | Parts by weight |
| --- | --- |
| Vinyl chloride-vinyl acetate-vinyl alcohol copolymer (containing 1% maleic acid, MW = 20,000) | 10 (solids) |
| Acryl-modified phenoxy resin (MW = 35,000) | 6 (solids) |
| Acryl-modified polyether urethane elastomer (MW = 20,000) | 24 (solids) |
| Solvent (70/30 MEK/cyclohexanone) | 200 |
| Higher fatty acid-modified silicone oil | 3 |
| Butyl myristate | 3 |

The thus prepared samples are designated Sample Nos. 401 through 404 (see Table 4). These samples were measured for various properties, that is, perpendicular coercive force, rectangular ratio, runnability, overwriting ability, and D50 by the same procedures as in Example 1.

All the samples had a perpendicular coercive force of 650 Oe. The results are shown in Table 4.

TABLE 4

| Sample No. | Particle diameter, μm | Flakiness | Orientation | $Br_\perp/Bm_\perp$ | Runnability ($\times 10^5$ passes) | Overwite (dB) | D50 (KFRPI) |
| --- | --- | --- | --- | --- | --- | --- | --- |
| 401 | 0.11 | 16 | OT 13 | 0.83 | 320 | −28 | 60 |
| 402* | 0.11 | 16 | OT 18 | 0.88 | 320 | −25 | 62 |
| 403 | 0.06 | 5 | OT 15 | 0.83 | 280 | −28 | 58 |
| 404* | 0.06 | 5 | OT 16 | 0.88 | 280 | −25 | 60 |

*comparison

EXAMPLE 5

Sample No. 501 was prepared by the same procedure as described for Sample A except that the radiation-curable binder was replaced by a thermosetting binder. More specifically, the total amount of 30 parts by weight of the vinyl chloride-vinyl acetate-vinyl alcohol copolymer (containing maleic acid) plus acryl-modified phenoxy plus acryl-modified polyether urethane elastomer was replaced by 15 parts by weight of a vinyl chloride-vinyl acetate-vinyl alcohol copolymer (VAGH manufactured by Union Carbide) and 15 parts by weight of a urethane (Nippolane 302 manufactured by Nippon Polyurethane K.K.). At the end of dispersion, 5 parts by weight (solids) of isocyanate compound (Colonate L manufactured by Nippon Polyurethane K.K.) was added to the magnetic paint composition. After surface smoothening, the coating was held at 80° C. for 48 hours for thermosetting.

Samples Nos. 101 and 501 were produced in the form of a jumbo roll by winding a web of 5000 m long on a take-up roll of 8 inches in diameter. Test specimens were cut out from inside and outside turns and determined for D50.

Sample No. 501 was found to have $Hc_\perp$ 700 Oe, $Br_\perp/Bm_\perp$ 0.73.

| Sample No. | D50 (KFRPI) Outside | D50 (KFRPI) Inside |
| --- | --- | --- |
| 101 | 58 | 58 |
| 501 | 58 | 55 |

As seen from these data, the tape (No. 501) using a thermosetting resin binder composition exhibits a reduction in D50, particularly a marked reduction in the inside due to tightening during the thermosetting process as compared with the tape using a radiation-curable resin binder composition. Curling due to tightening was also observed. The use of a radiation-curable resin binder composition is desirable for actual applications.

We claim:

1. A magnetic recording medium comprising
a substrate having opposing major surfaces and
a single magnetic layer on at least one major surface of the substrate consisting essentially of a plate magnetic powder having an average particle diameter of up to 0.2 μm and an average flakiness of at least 2 and a binder, the magnetic layer having a thickness of up to 1.8 μm,
wherein the magnetic recording medium has a coercive force having a value x as expressed in oersted and a rectangular ratio having a value y both in a direction perpendicular to the surface of the magnetic layer, which fall in the range defined by the following equations:

$400 \leq x \leq 800$, $y \leq 1$, and $0.5 \leq y \leq 0.75$ where $750 \leq x \leq 800$, and $0.5 \leq y \leq -0.001x + 1.5$ where $400 \leq x \leq 750$.

2. The magnetic recording medium of claim 1 wherein the range of x and y is defined by the equations:

$500 \leq x \leq 780$, and $0.5 \leq y \leq 0.75$ where $750 \leq x \leq 780$, and $0.5 \leq y \leq -0.001x + 1.5$ where $500 \leq x \leq 750$.

3. The magnetic recording medium of claim 1 wherein the flakiness is at least 6.

4. The magnetic recording medium of claim 1 wherein the binder is comprised of a radiation-curable resin.

5. The magnetic recording medium of claim 1 wherein the single magnetic layer is on each major surface of the substrate.

* * * * *